July 29, 1930. E. LATSHAW 1,771,932
MOTOR DRIVEN CAR, SWIVELED AXLES
Filed March 2, 1929
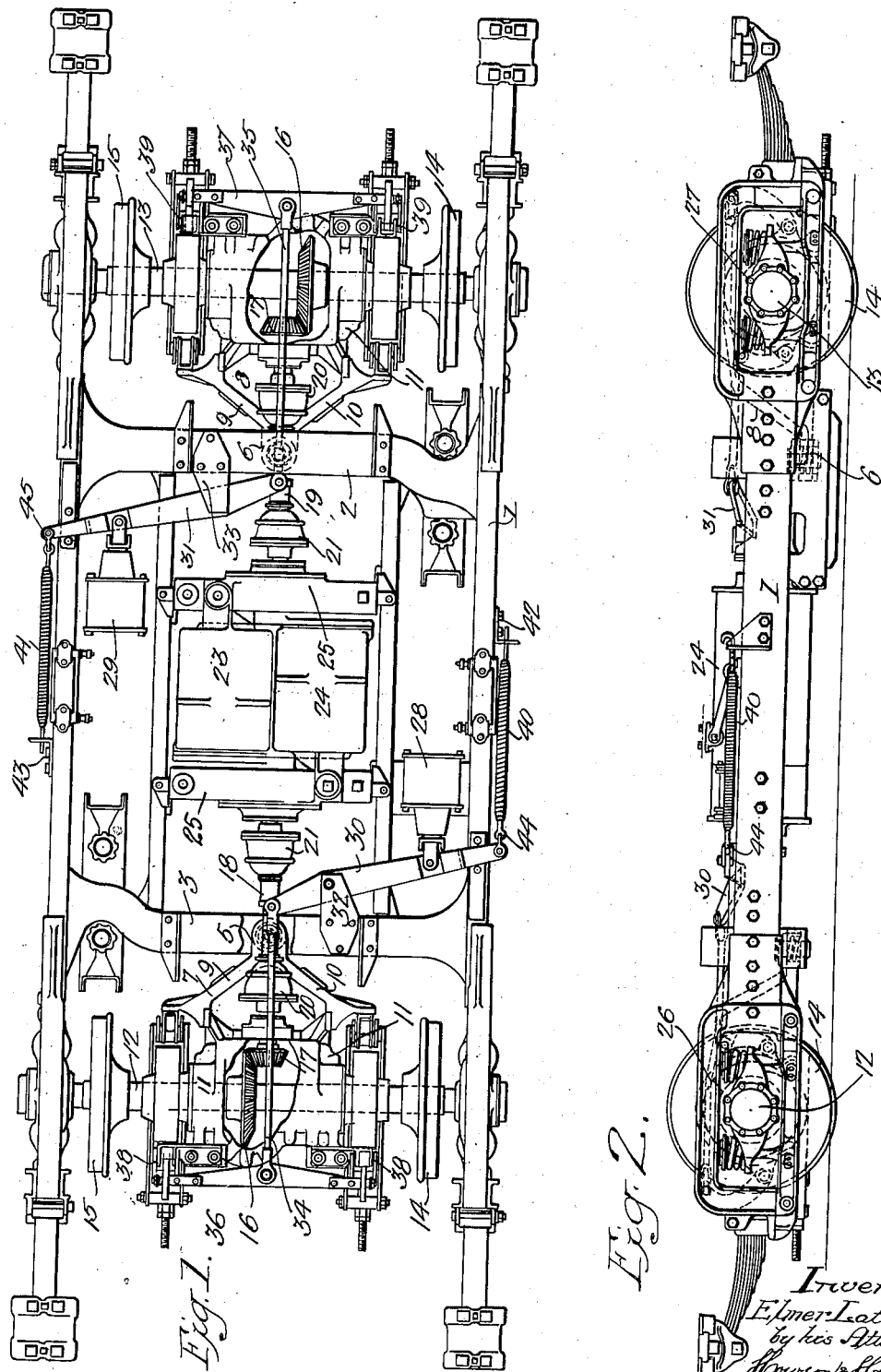

Patented July 29, 1930

1,771,932

UNITED STATES PATENT OFFICE

ELMER LATSHAW, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA

MOTOR-DRIVEN CAR, SWIVELED AXLES

Application filed March 2, 1929. Serial No. 343,917.

This invention relates to the propelling mechanism of an electrically driven railway vehicle.

An object of the invention is to provide a new and useful driving mechanism for an electrically driven vehicle.

Another object is to provide a plurality of motors, arranged side by side, for driving a vehicle.

Another object is to provide a plurality of motors, arranged side by side, for driving a vehicle, each motor being adapted to drive a separate shaft.

Another object is to design a railway vehicle having a plurality of drive shafts, each driven from a separate motor, each drive shaft having a plurality of universal joints therein.

Still another object is to design a railway vehicle having a separate drive shaft for each axle, each axle being mounted in a yoke which pivotally engages the truck-frame of the vehicle.

Yet another object is to produce an electric railway vehicle having a plurality of electric motors arranged side by side, each being provided with a shaft driving a single axle, each shaft having a plurality of universal joints therein, and each axle being in pivotal engagement with the truck-frame of the vehicle.

In the drawings, which illustrate one form of my invention,

Fig. 1 is a plan view of a truck-frame according to my invention, while

Fig. 2 is a side elevation thereof.

At 1 is illustrated broadly the truck-frame of a railway vehicle, having cross-bolsters 2 and 3, each of which is provided with a trunnion for the reception of pivotal bearings 5 and 6 on yoke members 7 and 8. As shown, each of the arms 9 and 10 of the yoke members 7 and 8 terminates in a head 11, having an opening therein forming a bearing surface. Mounted within these bearings in any suitable manner, are axles 12 and 13. Each axle is provided adjacent its extremities with wheels 14 and 15, while adjacent its center it carries a gear 16, preferably of the beveled type, meshing with a beveled pinion 17 on drive shafts 18 and 19. As shown, each gear system 16 and 17 is enclosed in a suitable housing which may be swung from the heads 11 of the yoke arms 9 and 10.

Each shaft 18 and 19 preferably has a plurality of universal joints 20 and 21, providing perfect flexibility to the shaft, and is attached in any suitable manner, as by gears (not shown), to the drive shaft of the corresponding motors 23 and 24. The motors 23 and 24 are arranged side by side with their longitudinal dimension extending lengthwise of the car, and are mounted in any suitable manner on the truck-frame. Each motor may be provided with a housing 25 for the protection of the gearing. The support for the axles 12 and 13 broadly indicated by the reference numerals 26 and 27 may be of any conventional type, permitting slight play of the axles, such for instance, as shown in the patent to Adams et al. #1,096,340, patented May 12, 1914.

A conventional form of brake equipment is shown in Fig. 1 where actuating means 28 and 29 move links 30 and 31 about pivot points provided in the fulcrums 32 and 33 secured respectively to the cross bolsters 3 and 2. The links 30 and 31 are pivotally connected at their inner extremities to rods 34 and 35, which in turn are connected at their opposite extremities to heads 36 and 37 which actuate shoes 38 and 39 respectively to positively actuate the linkage. To release the shoes after the actuating force exercised by members 28 and 29 has been discontinued, springs 40 and 41 have been provided, mounted at 42 and 43 to the truck-frame and in a pivotal manner at 44 and 45 to the links 30 and 31. It is of course understood that this construction may be of any desired type.

The operation of the vehicle is obvious from the above description. As the wheels 14 and 15 approach a curve in the track, they will adapt themselves to it, the axle 12 pivoting around the trunnions. Any angular movement to which the shafts 18 and 19 might be subjected is compensated for, by the universal connections employed.

It is of course understood that the invention is susceptible to numerous modifications and adaptations, and it is intended that it be limited only by the scope of the appended claims.

I claim:

1. In a railway vehicle, a truck-frame therefor, a plurality of motors mounted on said truck-frame, arranged side by side and extending longitudinally of said truck-frame, a separate shaft for each of said motors, said motors being adapted to drive said shafts, and an axle operatively associated with each of said shafts, said axles being pivotally connected to said truck-frame.

2. In a railway vehicle having a truck-frame, a plurality of electrical motors mounted centrally of said truck-frame and arranged side by side and extending longitudinally of said vehicle, separate shafts, each having a plurality of universal joints therein, connected to each of said motors, and an axle operatively associated with the extremity of each of said shafts, said axles being pivotally connected to said truck-frame.

ELMER LATSHAW.